(12) United States Patent
Wetzstein et al.

(10) Patent No.: US 11,922,562 B2
(45) Date of Patent: Mar. 5, 2024

(54) METHODS AND SYSTEMS FOR RENDERING VIEW-DEPENDENT IMAGES USING 2D IMAGES

(71) Applicant: Google LLC, Mountain View, CA (US)

(72) Inventors: Gordon Wetzstein, Fremont, CA (US); Andrew Jones, Fremont, CA (US); Petr Kellnhofer, Fremont, CA (US); Lars Jebe, Fremont, CA (US); Ryan Spicer, Fremont, CA (US); Kari Pulli, Fremont, CA (US)

(73) Assignee: Google LLC, Mountain View, CA (US)

( * ) Notice: Subject to any disclaimer, the term of this patent is extended or adjusted under 35 U.S.C. 154(b) by 16 days.

(21) Appl. No.: 17/644,291

(22) Filed: Dec. 14, 2021

(65) Prior Publication Data

US 2022/0189104 A1 Jun. 16, 2022

Related U.S. Application Data

(60) Provisional application No. 63/125,288, filed on Dec. 14, 2020.

(51) Int. Cl.
| | |
|---|---|
| G06T 15/20 | (2011.01) |
| G06F 3/01 | (2006.01) |
| G06N 3/048 | (2023.01) |
| G06T 7/55 | (2017.01) |
| G06T 17/20 | (2006.01) |

(52) U.S. Cl.
CPC .............. *G06T 15/20* (2013.01); *G06F 3/012* (2013.01); *G06N 3/048* (2023.01); *G06T 7/55* (2017.01); *G06T 17/20* (2013.01); *G06T 2207/20084* (2013.01)

(58) Field of Classification Search
None
See application file for complete search history.

(56) References Cited

U.S. PATENT DOCUMENTS

| | | |
|---|---|---|
| 2014/0009466 A1 | 1/2014 | Tzur et al. |
| 2020/0342652 A1 | 10/2020 | Rowell et al. |
| 2020/0342656 A1 | 10/2020 | Andrzej et al. |

OTHER PUBLICATIONS

Rainer, Gilles, et al. "Neural BTF compression and interpolation." Computer Graphics Forum. vol. 38. No. 2. 2019 (Year: 2019).*

(Continued)

*Primary Examiner* — Sarah Le
(74) *Attorney, Agent, or Firm* — Brake Hughes Bellermann LLP (57) ABSTRACT

Disclosed herein is methods and systems for providing different views to a viewer. One particular embodiment includes a method including providing, to a neural network, a plurality of 2D images of a 3D object. The neural network may include a signed distance function based sinusoidal representation network. The method may further include obtaining a neural model of a shape of the object by obtaining a zero-level set of the signed distance function; and modeling an appearance of the object using a spatially varying emission function. In some embodiments, the neural model may be converted into a triangular mesh representing the object which may be used to render multiple view-dependent images representative of the 3D object.

24 Claims, 5 Drawing Sheets

(56) References Cited

OTHER PUBLICATIONS

International Patent Application No. PCT/US2021/072920, Search Report and Written Opinion dated Apr. 27, 2022, 12 pages.
Park, J.J. et al. "DeepSDF: Learning Continuous Signed Distance Functions for Shape Representation" Computer Vision Foundation; Jan. 23, 2019; pp. 165-172.
Sitzmann, V. et al. "Implicit Neural Representations with Periodic Activation Functions" 34th Conference on Neural Information Processing Systems (NeurIPS 2020), Vancouver, Canada; Jun. 2000; 12 pages.
Liu, S. et al. "DIST: Rendering Deep Implicit Signed Distance Function with Differentiable Sphere Tracing"; arXiv:1911.13225v2; Jun. 2000; 11 pages.
Loubet, G. et al. "Reparameterizing Discontinuous Integrands for Differentiable Rendering" ACM Transactions on Graphics; vol. 38; Issue 6; Dec. 2019; Article No. 228; pp. 1-14.
Buehler, C. et al. "Unstructured Lumigraph Rendering" SIGGRAPH '01: Proceedings of the 28th annual conference on Computer graphics and interactive techniques; Aug. 2001; pp. 425-432.
Mildenhall, B. et al. "NeRF: Representing scenes as neural radiance fields for view synthesis" In Proc. ECCV, 2020; 25 pages.
Yariv, L. et al. "Multiview neural surface reconstruction by disentangling geometry and appearance" In Proc. NeurIPS, 2020; 11 pages.

\* cited by examiner

METHODS AND SYSTEMS FOR RENDERING VIEW-DEPENDENT IMAGES USING 2D IMAGES

CROSS REFERENCE TO RELATED APPLICATIONS

The present application claims priority to and the benefit of U.S. Provisional Patent Application No. 63/125,288, entitled "SineSDF: Periodic Signed Distance Functions for Fast Neural Rendering" and filed Dec. 14, 2020, the contents of which are incorporated herein by reference in their entirety.

FIELD OF THE INVENTION

The present invention relates to methods and systems for rendering view-dependent images and, more particularly, to methods and systems for generating a plurality of view-dependent images for displays.

BACKGROUND

Traditional 3D computer vision pipelines typically use structure-from-motion and multi-view-stereo algorithms to estimate sparse point clouds, camera poses, and textured meshes from 2D input views. Rerendering these scene representations, however, may not achieve photorealistic image quality. As an alternative, image-based rendering techniques have been explored, and lumigraph rendering stands out among these methods as an approach that better leverages proxy scene geometry to interpolate the captured views. Still, these traditional approaches may not produce photorealistic view synthesis for general 3D scenes, especially with real time rendering.

SUMMARY OF THE DISCLOSURE

As opposed to explicit representations, emerging neural implicit scene representations may produce 3D-structure-aware, continuous, memory-efficient representations for shape parts, objects, and/or scenes. These representations may define an object or a scene using a neural network and can be supervised directly with 3D data, such as point clouds, or with 2D multi-view images.

Systems and methods in accordance with various embodiments of the invention can include a head mounted display including: a display; a processor; and memory. The memory may include programming executable by the processor to: receive a plurality of 2D images of a 3D object; provide, to a neural network, the plurality of 2D images; generate a 3D neural model from the plurality of 2D images using a neural network; generate a triangular mesh using the 3D neural model; track head position of a viewer; and render a plurality of view-dependent images using the triangular mesh to generate a left view and a right view based on the head position of the viewer, wherein the head mounted display is configured to display the left view to a left eye of the viewer and the right view to a right eye of the viewer.

In various other embodiments, the neural network includes a signed distance function based sinusoidal representation network.

Further, various embodiments of the invention can include an image rendering system including: a processor and memory. The memory may include programming executable by the processor to: receive a plurality of 2D images of a 3D object; provide, to a neural network, the plurality of 2D images; generate a 3D neural model from the plurality of 2D images using a neural network; generate a triangular mesh using the 3D neural model; and render a plurality of view-dependent images using the triangular mesh to generate a left view and a right view based on a head position of a viewer; and display, on a head mounted display, the left view to a left eye of the viewer and the right view to a right eye of the viewer.

In various other embodiments, the neural network comprises a signed distance function based sinusoidal representation network.

Further, various embodiments of the invention can include an image rendering method for generating a plurality of view-dependent images at a display including a plurality of pixels, comprising: obtaining a 3D neural model from image data capturing a 3D shape of an object by obtaining a zero-level set of a signed distance function using a shape renderer of a rendering engine; modeling an appearance of the object by minimizing an image reconstruction error based upon the image data capturing the 3D shape of the object using an appearance renderer of the rendering engine; converting the neural model into a triangular mesh representing the object using the rendering engine; and rendering at least one image using the triangular mesh using the rendering engine.

In various other embodiments, the signed distance function is represented by:

$$S(x;\theta): \mathbb{R}^3 \to \mathbb{R},$$

where $x \in \mathbb{R}^3$ is a location in 3D space and $\theta$ is a first learnable parameter of a sinusoidal representation network.

In still various other embodiments, obtaining the zero-level set of the signed distance function comprises sphere tracing the signed distance function.

In still various other embodiments, sphere tracing the signed distance function includes:
  defining a view: $V \in \mathbb{R}^{4 \times 4}$;
  defining a projection matrix: $P \in \mathbb{R}^{4 \times 4}$;
  solving for a ray origin: $r_0 = (V^{-1} \cdot [0,0,1,0]^T)_{x,y,z}$;
  solving for a ray direction: $r_d = v((P \cdot V)^{-1} \cdot [u_x, u_y, 0, 1]^T)$, where $(\cdot)_{x,y,z}$ are vector components and $v(\omega) = \omega_{x,y,z} / \|\omega_{x,y,z}\|$ is vector normalization;
  minimizing $|S(x,\theta)|$ along each ray using iterative updates of a form: $x_0 = r_0$ and $x_{i+1} = x_i + S(x_i)r_d$; and
  solving for a zero-set of rays converged to a foreground object for a step count n: $S_0 = \{x_n | S(x_n) = 0\}$.

In still various other embodiments, modeling the appearance of the object includes using a spatially varying emission function E.

In still various other embodiments, modeling the appearance further comprises defining the spatially varying emission function E for directions $r_d \in \mathbb{R}^3$ in a global coordinate system.

In still various other embodiments, the image rendering method further includes conditioning the spatially varying emission function by a local normal direction $n = \nabla_x S(x)$ as computed by automatic differentiation.

In still various other embodiments, the spatially varying emission function is expressible as:

$$E(x, r_d, n, \theta, \phi): \mathbb{R}^9 \to \mathbb{R}^3,$$

where $\phi$ is a second learnable parameter of the sinusoidal representation network.

In still various other embodiments, the image rendering method further includes minimizing an image reconstruction error for the 3D object in foreground pixels of the display.

In still various other embodiments, the image reconstruction error is represented by:

$$\mathcal{L}_R = \frac{1}{|U|}\Sigma_{c \in I_{U_f}} |E(x, r_d, n; \theta, \phi) - c|,$$

where c is an RBG value of a foreground pixel of the display and U represents a portion of the pixels with RGB values $I_U$ and object masks $M_U$.

In still various other embodiments, the image rendering method further includes regularizing the signed distance function by an eikonal constraint.

In still various other embodiments, the eikonal constraint is represented by:

$$\mathcal{L}_E = \frac{1}{|U|}\Sigma_{x_r} \|(\|\nabla_x S(x_r; \theta)\|_2 - 1)\|_2^2,$$

where U represents a portion of pixels with RGB values $I_U$ and object masks $M_U$.

In still various other embodiments, the image rendering method further includes enforcing a projected pattern to fall within the boundaries of the object masks.

In still various other embodiments, enforcing the projected pattern includes using a soft mask loss defined for pixels other than the foreground pixels of the display.

In still various other embodiments, the soft mask loss is represented by:

$$\mathcal{L}_M = \frac{1}{\alpha|U|}\sum_{m \in M_{U/U_f}} BCE(sigmoid(-\alpha S_{min}), m),$$

where BCE is the binary cross entropy and $S_{min} = \arg\min_t S(r_0 + tr_d; \theta)$ is the minimum S value along the entire ray approximated by dense sampling of t.

In still various other embodiments, the image rendering method further includes regularizing the emissivity function to avoid overfitting to training views.

In still various other embodiments, regulating the emissivity function comprises linearizing the angular behavior using a smoothness term represented by:

$$\mathcal{L}_S = \frac{1}{|U|}\Sigma \|\nabla^2_{r_d} E(x, r_d, n; \theta, \phi)\|_2^2.$$

In still various other embodiments, the image rendering method further includes optimizing parameters θ and φ as:

$$\operatorname*{argmin}_{\theta,\phi} \mathcal{L}_R + w_E \mathcal{L}_E + w_M \mathcal{L}_M + w_S \mathcal{L}_S,$$

where $w_E$, $w_M$, and $w_S$ are weights for their respective loss functions.

In still various other embodiments, the image rendering method further includes rasterizing the triangular mesh; projecting vertex positions to each one of the plurality of pixels; computing angles $\tau_1 \ldots \tau_N$ between a ray towards a rendering camera and rays towards each of N projective texture map viewpoints.

In still various other embodiments, the image rendering method further includes applying unstructured lumigraph rendering to blend contributions from first k textures Ti, sorted by $\tau_i$ in ascending order to create a rendered image represented by:

$$R = \Sigma_{i=1 \ldots k} w_i T_i,$$

where weights $w_i$ are computed as $\hat{w}_i = 1/\tau_i(1 - \tau_i/\tau_k)$ and $w_i = \hat{w}_i / \Sigma_{i=1 \ldots k} \hat{w}_i$.

DETAILED DESCRIPTION

Novel view synthesis and 3D shape estimation from 2D images may include inverse problems of fundamental importance in applications as diverse as photogrammetry, remote sensing, visualization, AR/VR, teleconferencing, visual effects, and/or games. That is, it would be desirable to produce novel views of a 3D object, enabling view-dependent real-time rendering with photorealistic image quality using traditional graphics pipelines.

Emerging neural scene representations often model an object or scene explicitly using a 3D proxy geometry, such as an imperfect mesh or depth map estimated by multi-view stereo or other means, an object-specific shape template, a multi-plane or multi-sphere image, or a volume. However, state-of-the-art neural volume rendering approaches are slow to train and require minutes of rendering time for high image resolutions. That is, state-of-the-art neural rendering approaches, such as neural radiance fields, typically do not offer real-time frame rates, which severely limits their applicability to the aforementioned problems. This limitation may be primarily imposed by the choice of implicit neural scene representation and rendering algorithm, namely a volumetric representation that involves a custom neural volume renderer. Neural surface representations, for example using signed distance functions (SDFs), occupancy fields, or feature-based representations, on the other hand implicitly model the surface of objects. Although implicit neural surface representations can be shown to demonstrate impressive performance on shape reconstruction, their performance on view interpolation and synthesis tasks is limited. Thus, previous neural rendering approaches may either perform well for view synthesis or 3D shape estimation, but not both.

Embodiments described herein provide high-capacity neural scene representations with periodic activations for jointly optimizing an implicit surface and a radiance field of a scene, supervised exclusively with posed 2D images. The implicit surface representation described herein enables export of a 3D mesh with view-dependent texture information. Like existing implicit surface representations, the embodiments described herein are compatible with traditional graphics pipelines, enabling real-time rendering rates, while achieving unprecedented image quality compared to other surface methods. This approach may accelerate the neural volume rendering capacity by approximately two orders of magnitude over the existing state of the art.

Various embodiments of the 2D-supervised implicit neural scene representation and rendering approach include providing to a neural network a set of 2D multi-view images for optimizing representation networks modeling shape and appearance of a scene including an object. As an example, the scene may be modeled using a differentiable sphere tracer to generate a 3D model. The resulting 3D model may be exported to enable view-dependent real-time rendering using traditional graphics pipelines.

The 3D model may be a 3D point cloud. The neural network may include a neural surface representation using an SDF. The neural network may include an SDF-based sinusoidal representation network (SIREN). The neural model can be used to represent a shape of the object using supervision with 2D images via neural rendering. For example, a shape of the object may be represented by obtaining a zero-level set of the signed distance function. In some embodiments, the neural model may be converted into a triangular mesh representing the shape. The triangular mesh may be used to render multiple images representative of the 3D scene including the object. The multiple images may be based on different views based on the specific locations of a viewer's tracked eyes. In several embodiments, the surfaces of objects can be extracted from neural surface models using methods including (but not limited to) the marching cubes algorithm and exported into traditional mesh-based representations for real-time rendering.

In some embodiments, views are generated corresponding to the specific locations of tracked eyes. In some embodiments, the views may be displayed on a light field display. The light field display may include eye trackers which may track the user's eyes. Examples of systems and methods for generating different views based on a viewer's tracked eyes are described in U.S. Pat. Pub. No. 2021/0132693, entitled "Light Field Displays Incorporating Eye Trackers and Methods for Generating Views for a Light Field Display Using Eye Tracking Information" and filed Nov. 2, 2020 which is hereby incorporated by reference in its entirety for all purposes.

In some embodiments, the views may be displayed on a head mounted display, with different views displayed according to the position of the user's head, eyes, pupils, and/or gaze direction. For example, a head mounted display (e.g. AR, mixed reality, or VR headset) may be used which includes a tracker for tracking the user's head position and/or gaze direction.

Various disclosed embodiments include SDF-based SIREN as the backbone of a neural rendering system, which enables representation of signals with significantly higher complexity within the same number of learnable parameters compared to existing art, such as non-periodic multilayer perceptrons (MLP). It is further noted that neural implicit representations that use implicitly defined volumes are distinct from those using implicitly defined surfaces, for example represented as signed distance functions (SDFs) or occupancy networks. Surface-based representations may allow for traditional mesh representations to be extracted and rendered efficiently with traditional computer graphics pipelines.

Other techniques for neural rendering such as neural radiance fields (NeRF) may provide good image quality for view synthesis but do not directly model object shape. Similarly, implicit differentiable renderer (IDR), can demonstrate high performance for shape estimation, but does not achieve the same quality as NeRF for view synthesis. Use of a SIREN in accordance with various embodiments of the invention can achieve both of these capabilities simultaneously. Neural rendering pipelines in accordance with various embodiments of the invention utilize a SIREN, which learns a neural implicit surface representation and provides a high-quality 3D surface that can be directly exported in a format that is compatible with existing real-time graphics pipelines.

In some embodiments, the SDF-based SIREN approach may be used to learn 3D shapes using 2D supervision with images via neural rendering. A novel loss function that maintains the SIREN's high-capacity encoding for the supervised images is used in several embodiments of the invention to constrain SIREN's high-capacity encoding in the angular domain to prevent overfitting on these views. In a number of embodiments, this training procedure allows for robust fitting of a SIREN-based SDF directly to a sparse set of multi-view images. Advantageously, 2D-supervised implicit neural scene representation and rendering approaches can perform on par with NeRF on view interpolation tasks while providing a high-quality 3D surface that can be directly exported for real-time rendering.

In some embodiments, given a sparse set of 2D images of a 3D real-world object as seen from multiple angles, the SDF-based SIREN system may include a neural network acting as a shape and appearance renderer to learn a 3D representation of the object in the form of a SDF zero-level set and appearance function. A 3D mesh (e.g., 3D model) of the object may be created by converting the learned 3D representation into a triangle mesh and multiple textures. The triangle mesh may be provided as an input to a real-time renderer for generation of specific views from a given viewpoint to be displayed to a viewer. In an example, the neural network and the training thereof takes place remotely from the display device, while a real-time renderer may reside on the display device, such as a light field display or a head mounted display. In another example, all of the neural network, the training thereof, and the real-time image rendering are located off the display device or on the display device itself.

Various embodiments of the invention include a neural rendering framework including an implicit neural 3D scene representation, a neural renderer, and a custom loss function for training. Advantageously, this approach may achieve 10 times higher rendering rates than NeRF while providing comparable image quality with the additional benefit of optimizing an implicitly defined surface. In some embodiments. both shape and view-dependent appearance of the neural scene representation can be exported and rendered in real time using traditional graphics pipelines. A custom camera array may capture several datasets of faces and heads for providing baselines, which may be used for standardizing the approach for various objects and applications.

Neural rendering frameworks, neural rendering processes, and systems incorporating these approaches in accordance with various embodiments of the invention are discussed further below.

Light Field Displays Incorporating Eye Trackers

Figure 1A:
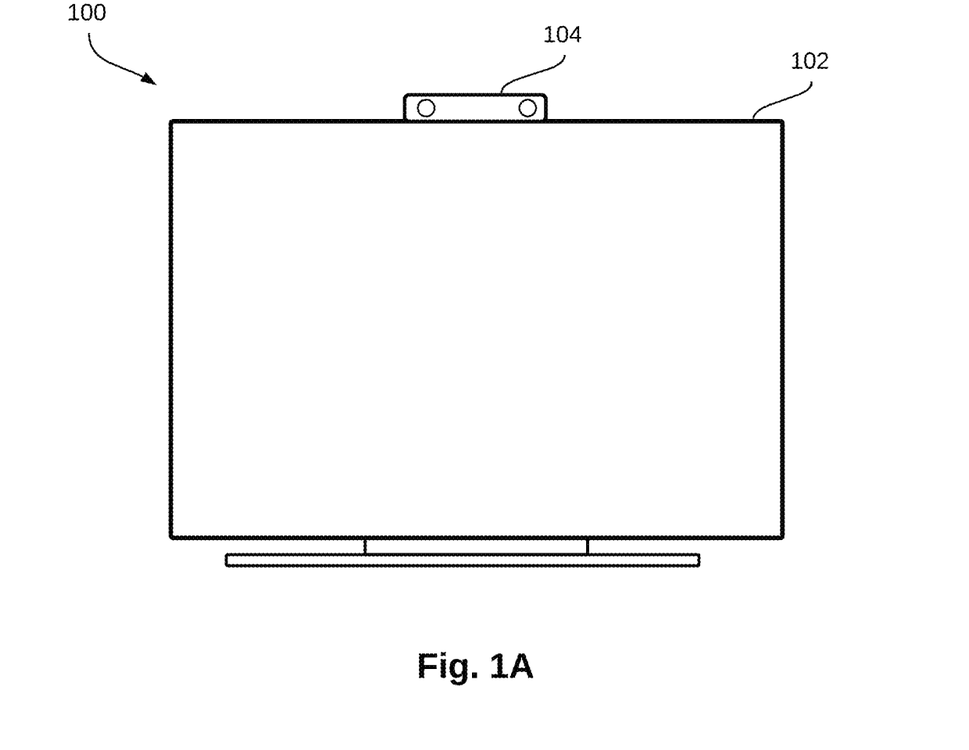
FIG. 1A illustrates a light field display that includes a display area formed by an array of angular pixels and one or more eye trackers in accordance with an embodiment of the invention.

As discussed above, generated views from different viewpoints may be displayed on a light field display based on the location of the viewer's eyes. FIG. 1A illustrates a light field display 100 that includes a display area 102 formed by an array of angular pixels and one or more eye trackers 104 in accordance with an embodiment of the invention. Each angular pixel can be thought of as similar to a conventional pixel in a 2D display with the difference that its appearance can vary across the field of view of the display. In this way, each viewing zone of the light field display can display an image with a resolution equal to the number of angular pixels in the light field display. Each angular pixel can include an array of light emitters, such as described for example in US Pat. Pub. No. US2019/0333443, entitled "Architecture for Light Emitting Elements in a Light Field Display," US Pat. Pub. No. US2019/0335165, entitled "Partial Light Field Display," and US Pat. Pub. No. US2019/0333444, entitled "Architecture for Light Emitting Elements in a Light Field Display," all of which applications are incorporated herein by reference in their entirety for all purposes.

In some embodiments, the light field display 100 may include a computing system for rendering multiple 2D views. An example of this computing system may be found in FIG. 3 described in detail below. In some embodiments, the light field display 100 may be connected to a separate computing system and may receive the pre-rendered multiple 2D views from the separate computing system. The light field display 100 may export the eye-tracking data from the one or more eye trackers 104 to the separate computing system which may use this eye-tracking data to generate corresponding 2D views.

Head Mounted Display Incorporating Head Tracking

Figure 1B:
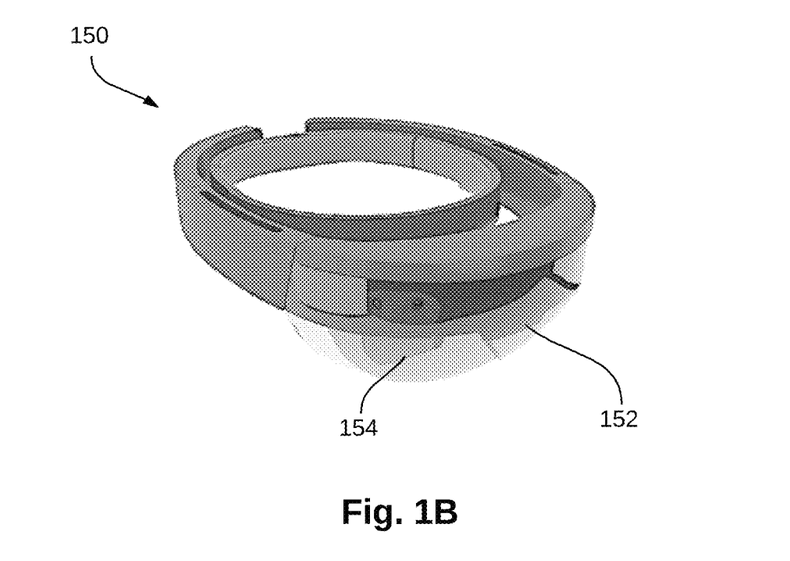
FIG. 1B illustrates a head mounted display that displays a left image and a right image based on a user's head position in accordance with an embodiment of the invention.

As discussed above, generated views including multiple 2D images may be displayed on the position of user's head. FIG. 1B illustrates a head mounted display that displays a left image and a right image based on a user's head position. The head mounted display 150 may include a left display 152 and a right display 154 for displaying different images to the left eye and the right eye of the user respectively. The head mounted display 150 may also include a head tracker which may track the position of the user's head. In some embodiments, the head tracker may track the position of the user's head, eyes, pupils, and/or gaze direction.

Figure 3:
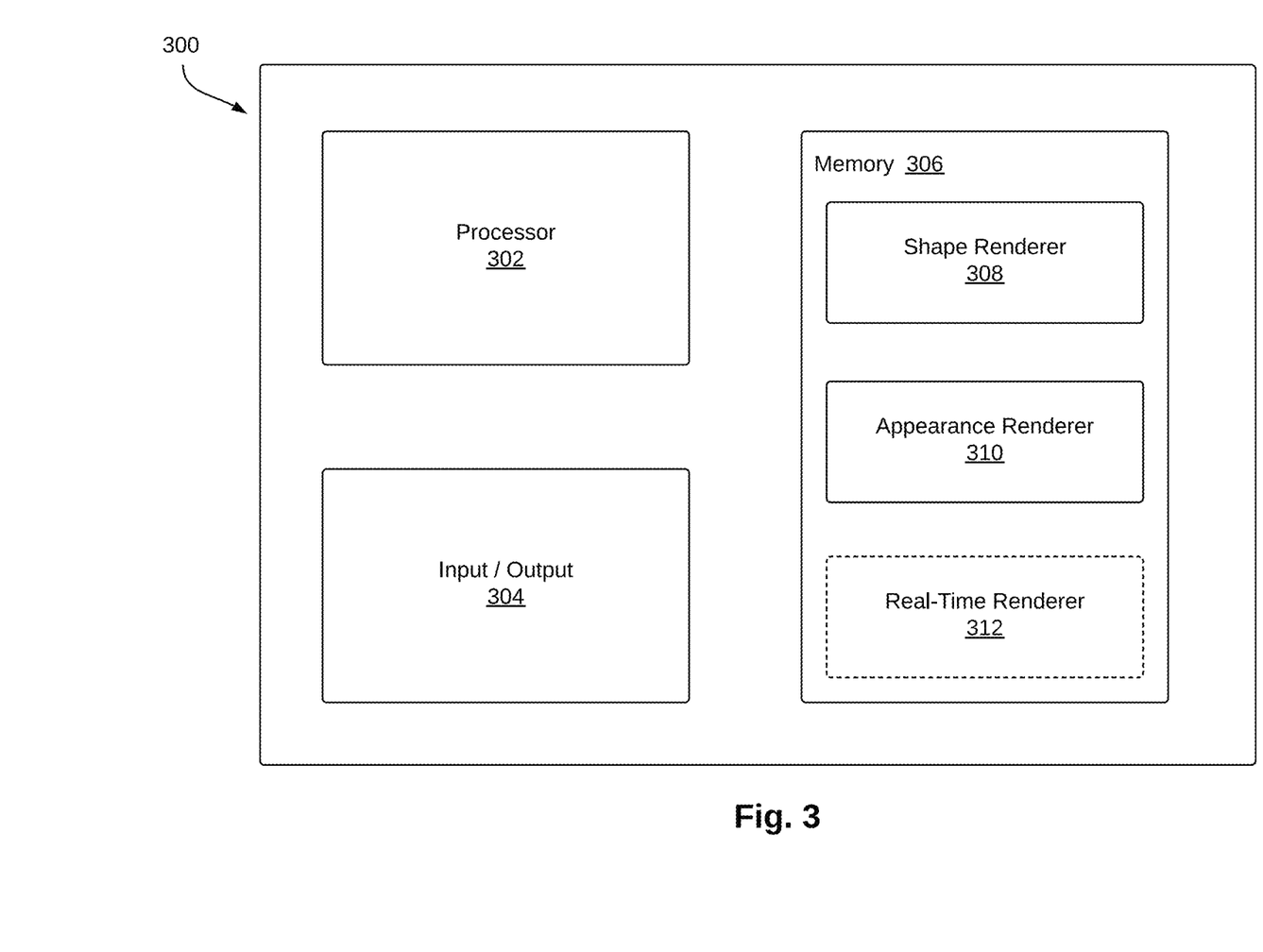
FIG. 3 is a block diagram of a computing system which renders view-dependent 2D images in accordance with an embodiment of the invention.

In some embodiments, the head mounted display 150 may include a computing system for rendering multiple 2D views, such as that shown in FIG. 3. Like the light field display 100 of FIG. 1A, in some embodiments, the head mounted display 150 may be connected to a separate computing system and may receive the pre-rendered multiple 2D views from the separate computing system. The head mounted display 150 may export the head position data to the separate computing system which may use this head position data to generate corresponding 2D views.

Neural Rendering System

Figure 2:
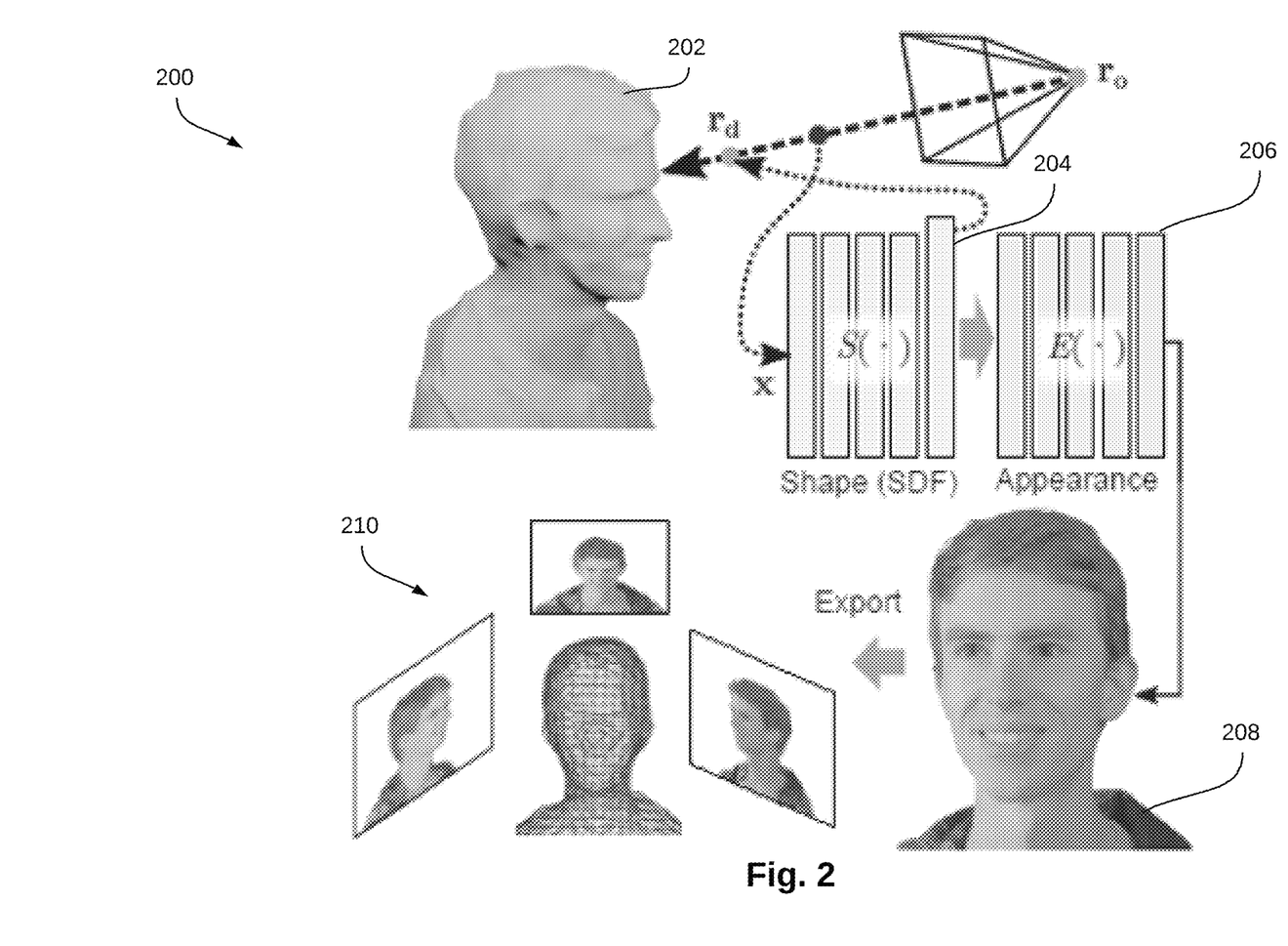
FIG. 2 illustrates a schematic representation of a neural network pipeline in accordance with an embodiment of the invention.

Various embodiments of the invention may include a neural rendering system. FIG. 2 illustrates a schematic representation of a neural network system 200 for modeling the shape and appearance of a 3D object 202 using implicit functions, in accordance with an embodiment of the invention. The neural network system 200 may include a shape (SDF) renderer 204 which feeds into an appearance renderer 206. The input provided to shape (SDF) renderer 204 can include a set of 2D images of the 3D object 202 within a scene. In some embodiments, the input provided to the shape (SDF) renderer 204 may be a 3D mesh (e.g., from another method or a depth sensor). In several embodiments, the shape SDF renderer 204 models the shape of the 3D object using a differentiable sphere tracer. The output from shape (SDF) renderer 204 and appearance renderer 206 may be a 3D neural model 208 of 3D object 202. The resulting 3D neural model 208 may be, for instance, a 3D mesh that may be exported to a real-time image rendering pipeline for producing a variety of view-dependent images 210 of the original 3D object 202 by, for example, converting the 3D mesh into a triangle mesh and a plurality of textures. In an example, shape (SDF) renderer 204 models the shape of 3D object 202 using a differentiable sphere tracer.

FIG. 3 is a block diagram of a computing system 300, which models the shape and appearance of a 3D object from a set of 2D views, in accordance with an embodiment of the invention. The computing system 300 may be a standalone computing system or a system implemented on a head mounted display as described in connection with FIG. 1B or a light field display as described in connection with FIG. 1A. The computing system 300 includes a processor 302 for controlling the operations of an input/output interface 304, which is capable of receiving and transmitting data, such as a set of 2D views of a 3D object, a 3D neural model such an object model, and a real-time rendering of view-dependent images, and a memory 306. The memory 306 includes programming including a shape renderer 308 and an appearance renderer 310 which is executable by the processor. Optionally, memory 306 may further include a real-time renderer 312 for using the output from appearance renderer 310 to generate in real-time a plurality of view-dependent images for displaying to a viewer. In other embodiments, the real-time renderer 312 may be implemented separately from computing system 300, for example, at the display device such as a head mounted display or a light field display.

In some embodiments, the shape renderer 308 and the appearance renderer 310 include a neural network. The input/output 304 may receive a set of 2D images of a 3D object and feed these 2D images into the shape renderer 308 and the appearance renderer 310. In several embodiments, the neural network includes a sinusoidal representation network based on a signed distance function. In some embodiments, the appearance renderer 310 may model the appearance of the object. The shape renderer 308 may generate a neural model of a shape of an object by obtaining a zero-level set of a signed distance function. The neural model may then be converted by real-time renderer 312 into a triangular mesh representing the shape of the 3D object being imaged so as to render multiple view-dependent images representative of the shape of the 3D scene including the object using the triangular mesh. The input/output 304 may provide as an output the shape and the appearance from shape renderer 308 and appearance renderer 310 to an external rendering system, which may be used to render multiple view-dependent 2D images for display to a viewer. Alternatively, input/output 304 may directly provide the view-dependent 2D images from real-time renderer as the output. In some embodiments, the input/output 204 may receive tracking information such as head tracking data or eye-tracking data which may be used by real-time renderer 312 to generate corresponding views.

Figure 4:
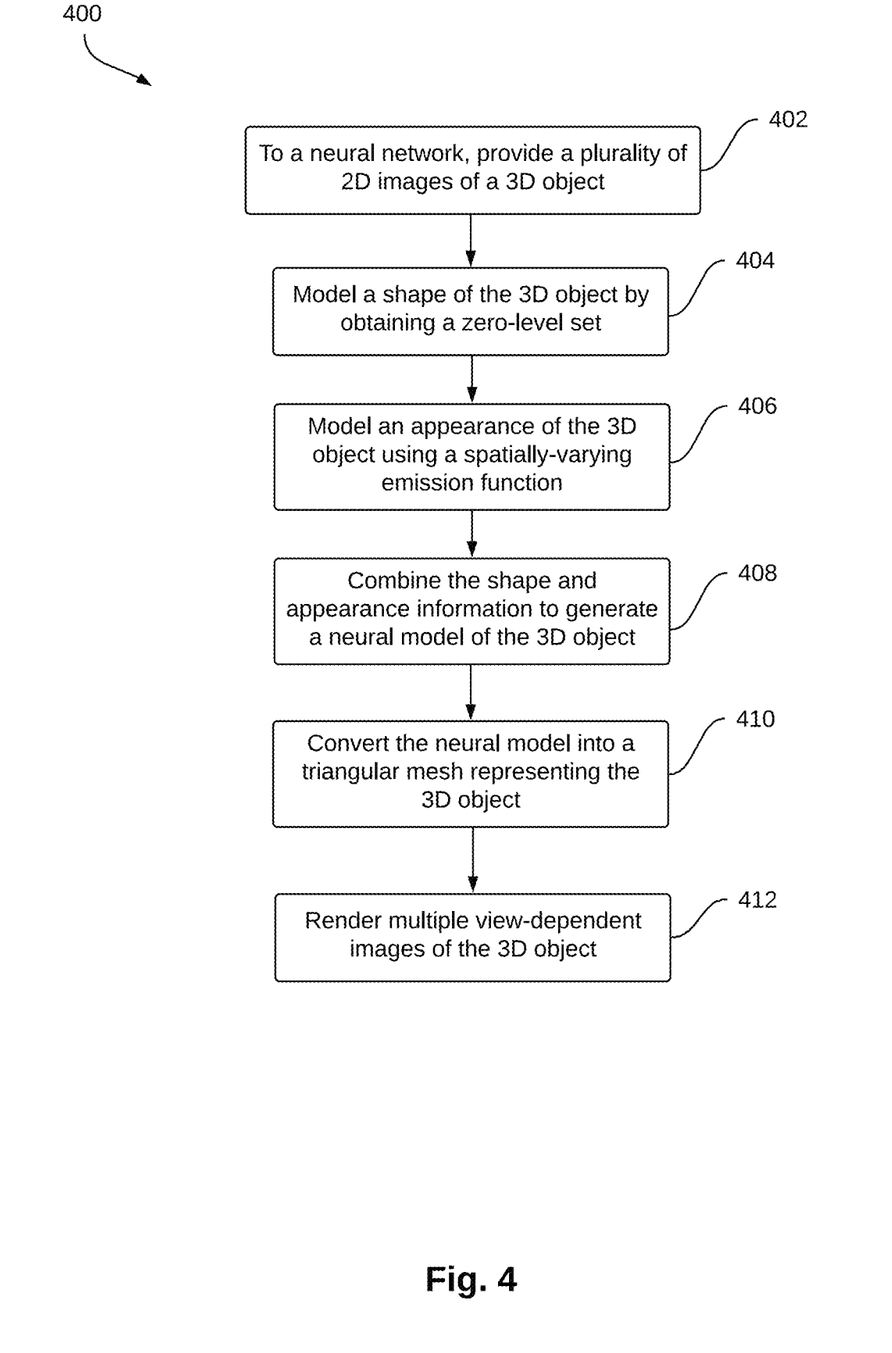
FIG. 4 is a flowchart of a method for rendering view-dependent 2D images in accordance with an embodiment of the invention.

FIG. 4 is a flowchart of a method for rendering in real-time a plurality of view-dependent images, in accordance with an embodiment of the invention. The method 400 includes providing (402), to a neural network, a plurality of 2D images of a 3D object. The neural network may be implemented, for example, as shape renderer 308 and/or the appearance renderer 310 of FIG. 3. In an example, the neural network includes a SDF-based sinusoidal representation network. The method 400 further includes modeling (404) a shape of the 3D object by obtaining a zero level set. The zero level set may be of the signed distance function. Step 404 may be implemented, for example, in shape renderer 308 of FIG. 3. The method 400 further includes modeling (406) an appearance of the 3D object using a spatially varying emission function. Step 406 may be implemented, for instance, at appearance renderer 310 of FIG. 3.

Continuing to refer to FIG. 4, method 400 further includes combining (408) the shape and appearance information from steps 404 and 406 to generate a neural model of the 3D object. Step 408 may be implemented, for instance, in the processor 302 and/or the memory 306 of FIG. 3. The method 400 further includes converting (410) the neural model into a triangular mesh representing the 3D object. Step 410 may be implemented, for example, in the real-time renderer 312 of FIG. 3. The method 400 further includes rendering (412) multiple view-dependent images of the 3D object using the triangular mesh from step 410.

In some embodiments, representation of both shape and appearance of 3D objects may be performed using implicit functions in a framework similar to IDR. In some embodiments, the network architecture may built on a SIREN, which can allow representation of signals of significantly higher complexity compared with common non-periodic multilayer perceptrons (MLP) using the same number of learnable parameters.

The continuous shapes of a scene may be expressed as a zero-level set $S_0 = \{x | S(x) = 0\}$ of a signed distance function (SDF)

$$S(x;\theta): \mathbb{R}^3 \to \mathbb{R}, \tag{1}$$

where $x \in \mathbb{R}^3$ is a location in 3D space and $\theta$ is a learnable parameter of the sinusoidal representation network.

Next, a spatially varying emission function, or radiance field, E for directions $r_d \in \mathbb{R}^3$ may be defined in a global coordinate system. This formulation may not allow for relighting but can enable photorealistic reconstruction of the appearance of a scene under fixed lighting conditions. In some embodiments. modeling lighting and shading may be performed.

E may be conditioned by the local normal direction $n = \nabla_x S(x)$ as computed by automatic differentiation. This may not constrain any degrees of freedom but may improve the training performance. $\theta$ may be used to increase the network capacity and allow for modeling of fine spatial details and microreflections that are of a notably higher spatial complexity than the underlying shape. Together, the radiance field may be expressed as $$E(x, r_d, n; \theta, \phi): \mathbb{R}^9 \to \mathbb{R}^3 \tag{2}$$

to represent RGB appearance using the additional learnable parameters $\phi$.

The neural rendering may be used to project a 3D neural scene representation into one or multiple 2D images. In some embodiments, this may be performed in two steps: 1) Find the 3D surface as the zero-level set $S_0$ closest to the camera origin along each ray; 2) Resolve the appearance by sampling the local radiance E.

Sphere tracing the SDF may be used in step 1) to find $S_0$. A view and a projection matrix, $V \in \mathbb{R}^{4 \times 4}$ and $P \in \mathbb{R}^{4 \times 4}$, may be defined similar to OpenGL's rendering API. A ray origin $r_0$ and direction $r_d$ for an output pixel at relative projection plane location $u \in [-1, 1]^2$ is then $$r_0 = (V^{-1} \cdot [0,0,1,0]^T)_{x,y,z} \tag{3}$$

$$r_d = v((P \cdot V)^{-1} \cdot [u_x, u_y, 0, 1]^T) \tag{4}$$

where $(\cdot)_{x,y,z}$ are vector components and $v(\omega) = \omega_{x,y,z} / \|\omega_{x,y,z}\|$ is vector normalization.

The sphere-tracing algorithm may minimize $|S(x, \theta)|$ along each ray using iterative updates of the form $$x_0 = r_0, x_{i+1} = x_i + S(x_i) r_d. \tag{5}$$

Finally, $S_0 = \{x_n | S(x_n) = 0\}$ may be the zero-set of rays converged to a foreground object for the step count n=16. A small residual $|S(x_n)| < 0.005$ may be tolerated. Gradients may be retained in the last step rather than for all steps of the sphere tracer. Advantageously, this approach makes sphere tracing memory efficient. The appearance may be directly sampled from the radiance field as $E(S_0, r_d, \nabla S(S_0); \theta, \phi)$.

3D representations may be supervised using a set of m multi-view 2D images $I = \mathbb{R}^{m \times w \times h \times 3}$ with known object masks $M = \mathbb{R}^{m \times w \times h}$ where 1 marks foreground. Leveraging a SIREN as a neural representation in this setting may be challenging, because of the SIREN's tendency to overfit the signal to the supervised views.

In total, four different constraints may be used to optimize the end-to-end representation using mini-batches of image pixels U with RGB values $I_u$ and object masks $M_U$.

First, an L1 image reconstruction error may be minimized for the true foreground pixels $U_f = U \cap S_0 \cap \{U | M_U = 1\}$ as $$\mathcal{L}_R = \frac{1}{|U|} \Sigma_{c \in I_{U_f}} |E(x, r_d, n; \theta, \phi) - c| \tag{6}$$

where c is an RGB value of a foreground pixel in a mini-batch. Both L1 and L2 work well but L1 may produce marginally sharper images.

Second, the S may be regularized by an eikonal constraint $$\mathcal{L}_E = \frac{1}{|U|} \sum_{x_r} \|(\|\nabla_x S(x_r; \theta)\|_2 - 1)\|_2^2 \tag{7}$$

to enforce its metric properties important for efficient sphere tracing. Random points $x_r$ may be uniformly sampled from a cube which encapsulates the object's bounding unit radius sphere.

Third, the coarse shape may be restricted by enforcing its projected pattern to fall within the boundaries of the object masks. For this purpose, the soft mask loss may be used for the pixels other than the foreground pixels and softness parameter % as $$\mathcal{L}_M = \frac{1}{\alpha |U|} \sum_{m \in M_{U/U_f}} BCE(\text{sigmoid}(-\alpha S_{min}), m) \tag{8}$$

where BCE is the binary cross entropy and $S_{min} = \arg\min_t S(r_0 + t r_d; \theta)$ is the minimum S value along the entire ray approximated by dense sampling of t.

Finally, the radiance field E may be regularized to avoid overfitting to training views. SIRENs have a remarkable regressive potential, which biases them to overfit the appearance to the training views. This power may be leveraged to allow for encoding of photorealistic surface details, but the behavior of the E may be restricted in the angular domain conditioned by $r_d$ to achieve favorable interpolation behavior. The angular behavior may be linearized using a smoothness term $$\mathcal{L}_S = \frac{1}{|U|} \sum \left\| \nabla^2_{r_d} E(x, r_d, n; \theta, \phi) \right\|^2_2 \quad (9)$$

Note that such level of control is unique to SIREN and related architectures as they may be $C^\infty$ differentiable.

Together, parameters $\theta$ and $\phi$ may be optimized as $$\operatorname*{argmin}_{\theta,\phi} \mathcal{L}_R + w_E \mathcal{L}_E + w_M \mathcal{L}_M + w_S \mathcal{L}_S \quad (10)$$

with weights $w_E=0.1$, $w_M=100$, and $w_S=0.01$. The performance may not be very sensitive to the weight choices with the exception of $w_S$ where large values cause high-frequency artifacts in S.

The loss may be optimized in mini-batches of 50,000 individual rays sampled uniformly across the entire training dataset. A large batch size and uniform ray distribution may be critical to prevent local overfitting of the SIREN, especially for the high-frequency function E.

MLPs representing S and E may be implemented as SIRENs with 5 layers using 256 hidden units each. Additionally, Fourier features $\{\sin(2k\pi r_d), \cos(2k\pi r_d)|k\in 1\ldots 4\}$ in E may be used to further support angular resolution. This strategy may be used to fit the sparsely supervised rays well while $\mathcal{L}_S$ enhances interpolation between them.

In some embodiments, S may be initialized to a unit sphere of radius 0.5 by pretraining to a procedural shape. The object rays may be traced in a larger sphere of radius 1, but the smaller initial radius improves the initial fit as well as the consequent convergence rate.

In some embodiments, the modeling of the shape, the modeling of the appearance, the linearizing, and the optimizing discussed above may be combined to generate a neural model representing the 3D object.

PyTorch may be used and the loss may be optimized using the Adam solver with an initial learning rate of 10-4 decreased by a factor of 2 every 40,000 batches for the overall training length of 150,000 batches on a processor such as a single Nvidia GPU RTX 2080Ti. In an example, the training data may be a set of 2D images capturing the 3D object from multiple different angles at the same moment of time. The positions of the cameras capturing the 2D images are also known via calibration processes.

Real-Time Rendering Pipeline

While a SIREN may be efficient in shape and appearance representation with 2D supervision, the sphere tracer may not run at real-time rates for moderate to high image resolutions. To overcome this challenge, the compactness of the surface-based representation may be useful to convert the neural model to a triangular mesh suitable for real-time computer graphics applications. For this purpose, unstructured lumigraph rendering, which preserves view-dependent effects learned by a neural representation may be used.

The marching cubes algorithm may be used to extract a high-resolution surface mesh from the SDF S voxelized at a resolution of 512³. Instead of extracting the zero-level set, offsetting the iso-surface of S by 0.5% of the object radius in the outside direction may optimize the resulting image quality. To export the appearance, the optimized emissivity function E may be resampled to synthesize projective textures $T_i$ for N camera poses and corresponding projection matrices. The ability to resample the camera poses for efficient viewing space coverage may be advantageous. In some embodiments, the choice of N and camera distributions may be optimized.

The extracted mesh may be rasterized using OpenGL and the vertex positions may be projected to each pixel. Next, angles $\tau_{1\ldots N}$ may be computed between the ray towards the current rendering camera and the rays towards each of the N projective texture map viewpoints. An unstructured lumigraph rendering technique may be applied to blend contributions from the first k=5 textures, sorted by $\tau_i$ in ascending order, yielding a rendered image $$R = \Sigma_{i=1\ldots k} w_i T_i \quad (11)$$

where weights $w_i$ are computed as $$\hat{w}_i = 1/\tau_i (1 - \tau_i/\tau_k) \quad (12)$$

$$w_i = \hat{w}_i / \Sigma_{i=1\ldots k} \hat{w}_i. \quad (13)$$

This formulation may satisfy the epipolar consistency by converging to an exclusive mapping by texture $T_j$ when $\tau \rightarrow 0$. Additionally, samples from occluded textures may be discarded by setting their $w_i$ to zero. Occlusions may be detected by a comparison between the pre-rendered depth associated with a texture and the distance between the mesh voxel and the texture viewpoint. The same technique may be commonly used in real-time graphics for shadow mapping.

The efficiency of the real-time rasterized neural lumigraph renderer (NLR-RAS) may be compared with the sphere-traced renderer (NLR-ST) discussed above along with other baselines in Table 1:

TABLE 1

| Method | Render time [s] | Model size [MB] |
| --- | --- | --- |
| Colmap | Real-time | 30.39 |
| IDR | 45 | 11.13 |
| NV | 0.65 | 438.36 |
| NeRF | 150 | 2.27 |
| NLR-ST | 13 | 2.07 |
| NLR-RAS | Real-time | 34.68 |

Table 1 illustrates rendering time and representation size comparison for the DTU scan 65 at 1600×1200 pixel resolution. "Real-time" denotes frame rates of at least 60 fps. Although both the above disclosed NLR-ST and IDR are based on sphere tracing, the capacity of SIREN allows for a smaller and faster model, which is evident by the model size. Furthermore, the implicit volumetric rendering may be costly. Only the explicit representations of Colmap and the NLR-RAS allow for truly real-time performance with framerates over 60 fps at HD resolution on commodity hardware.

Both the quantitative comparisons and qualitative examples demonstrate high NLR-RAS rendering quality. While lower than that of the NLR-ST renderer, the NLR-RAS still achieves peak signal-to-noise ratios (PSNRs) far superior to other explicit (Colmap) and implicit (IDR) surface representations.

Camera Array and Data

Figure 5:
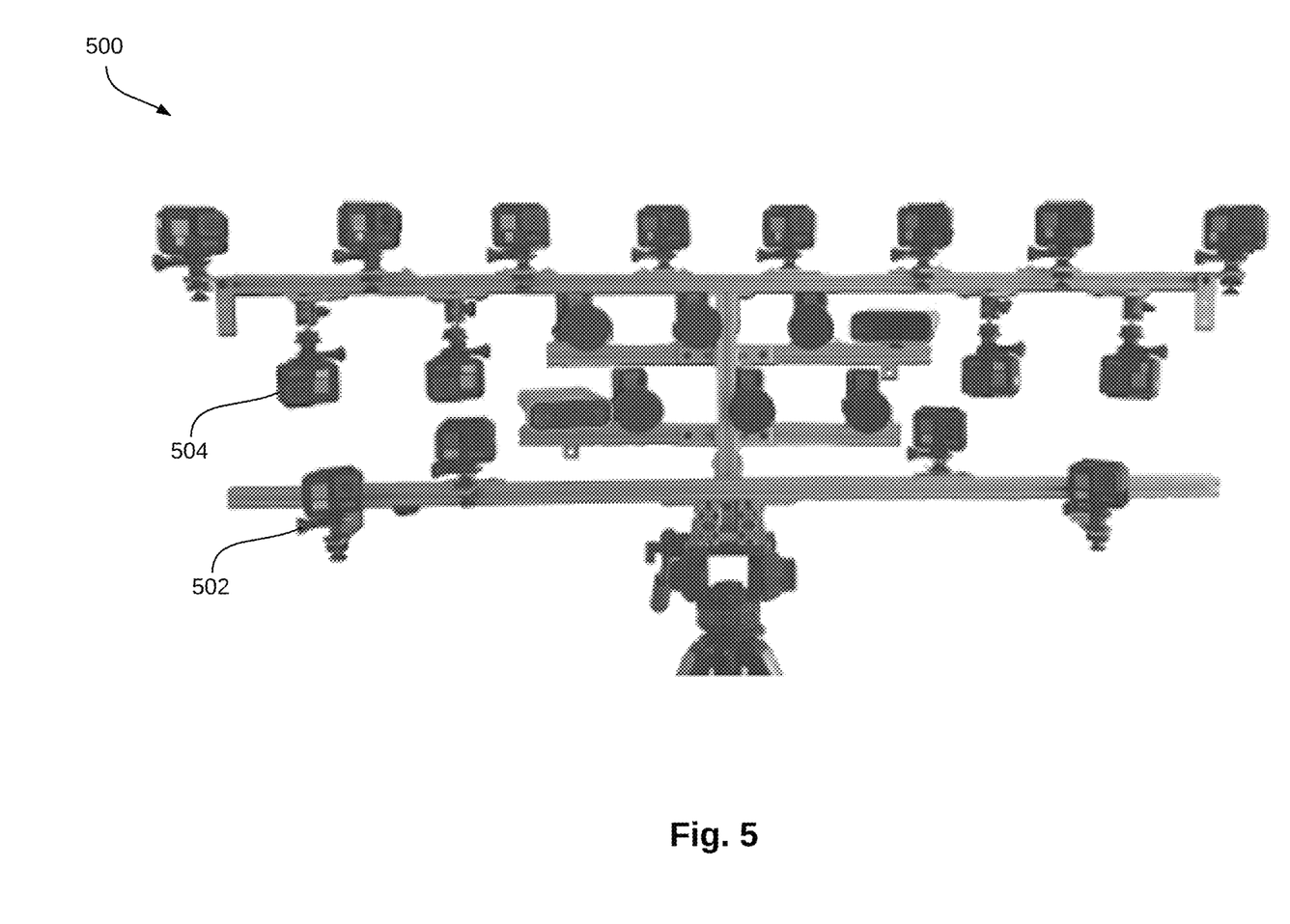
FIG. 5 is a frontal view of a custom camera array in accordance with an embodiment of the invention.

The initial dataset may include seven multiview captures showing a person performing facial expressions. A custom camera array may be used to capture the dataset. FIG. 5 shows a frontal view of the custom camera array in accordance with an embodiment of the invention. The camera array 500 may include six Back-Bone cameras 502 in the center of the array and 16 background cameras 504 placed around them. The Back-Bone cameras 502 and the background cameras 504 may include large circular lenses. The Back-Bone cameras 502 and the background cameras 504 may be GoPro HERO 7 Cameras. A subject may be 60 cm distance from the cameras 502, 504 and the cameras 502, 504 may cover approximately 100°. The Back-Bone cameras 502 may be modified GoPro cameras that can fit a standard C-Mount lens. Whereas the background cameras 504 may be unmodified Go-Pro cameras. The Back-Bone cameras 502 may have a narrower field-of-view (FoV) and are thus able to capture the subject in more detail. The Back-Bone cameras 502 may capture at 4k/30 fps in portrait orientation and at 1080p/60 fps in landscape orientation with the GoPro cameras.

The camera shutter may be triggered with a remote connected wirelessly. The cameras 502, 504 do not support a generator lock, so during capture they may be only loosely synchronized. Videos may be used for the dataset, even in the cases in which only a static frame is used. To improve synchronization, an ArUco marker may be flashed on a cellphone before each capture. The first frame may be detected that sees the marker in each video which allows the synchronization of the cameras 202,204 with an accuracy of 1 frame or better.

The method is able to achieve state-of-the-art image reconstruction quality on-par with volumetric methods such as NeRF while allowing for efficient surface reconstruction utilized for real-time rendering. The disclosed method was compared to novel view synthesis techniques with various scene representations. Specifically, the method was compared to the traditional multi-view stereo of Colmap, the explicit volumetric representation of Neural Volumes (NV), the implicit volume representation of NeRF [38], and the implicit signed distance function of IDR.

A multiple view stereo (MVS) dataset was used with 49 or 64 calibrated camera images along with object masks to measure the image reconstruction error metrics. Three views were held out for testing. The image quality was significantly better than that of IDR. This may be attributed to major separation to the unparalleled representation capacity of SIRENs.

Additionally, the shape reconstruction error was reported as Chamfer distance from the ground-truth provided in the dataset. Although the shape reconstruction may not be the goal, the error may be on par with other techniques, though worse than IDR which explicitly focuses on shape reconstruction. This may be a trade-off between the accuracy of view-dependent and high-frequency details in the image reconstruction on one hand, and the view consistency reflected in the geometry on the other one.

The angular smoothness loss $\mathcal{L}_S$ may be specifically designed to avoid collapse of the emissivity function E for interpolated views. The efficiency was tested quantitatively by measuring the image reconstruction error on test views. There was a measurable quality drop when compared to the training views observed consistently for all of the methods. However, the interpolated views produced by the method maintain many of the favorable characteristics from the regression case.

View-synthesis of human subjects may be particularly challenging due to the complex reflection properties of skin, eyes and hair, as well as a lack of high-quality multi-view data. The first challenge may be addressed with the high-capacity representation network and the latter with the dataset. The disclosed method achieves a bigger advantage for very high-resolution (3000×4000 px) detailed images. This may show that the traditional ReLU based networks used by IDR and NeRF have reached their capacity, while the explicit representations of Colmap and NV lack easy scaling.

Finally, the performance of the method may be verified based on the choice of the representation and training procedure. A standard MLP with ReLU may not have the capacity to train a detailed representation. SIREN remedies this but may quickly overfit to the trained pixels. This may be resolved by adding the angular smoothness loss $\mathcal{L}_S$ that regularizes behavior in the angular domain, and then by increasing the batch size in order to achieve spatially uniform image quality. Additional Fourier Features or the ray direction may remove low frequency noise in E.

Various embodiments of the disclosure include a neural rendering framework that optimizes an SDF-based implicit neural scene representation given a set of multi-view images. This framework may be unique in combining a representation network architecture using periodic activations with a sphere-tracing based neural renderer that estimates the shape and view-dependent appearance of the scene. Enabled by a novel loss function that is applied during training, the framework may achieve a very high image quality that is comparable with state-of-the-art novel view synthesis methods. As opposed to those methods, the neural representation can be directly converted into a mesh with view-dependent textures that enable high-quality 3D image synthesis in real time using traditional graphics pipelines.

In some embodiments, emissive radiance functions may model a scene under fixed lighting conditions. Some embodiments may include dynamic lighting and shading. Further, similar to IDR, the disclosed method may benefit from annotated object masks. Automatic image segmentation may be used to alleviate the need for annotated object masks. Although the synthesized image quality of the discussed approach is competitive with the state of the art, the proxy shapes produced by the disclosed method may not quite as accurate as alternative approaches. While this may not be important for the novel view synthesis applications, other applications may benefit from estimating more accurate shapes. Some embodiments may include occasional visible seam artifacts caused by inaccuracies of the camera calibration. Similar to some other recent neural rendering pipelines, the disclosed neural rendering pipeline focuses on overfitting a neural representation on a single 3D scene. Some embodiments include learning shape spaces, or priors, for certain types of objects, such as faces. While several methods have explored related strategies using conditioning-by-concatenation, hypernetwork, or metalearning approaches using synthetic data, there is a lack of publicly available photorealistic multi-view image data. Although the inference time of the disclosed method is fast, the training time may still be slow. More computing resources may allow exploring dynamic video sequences.

Although only a few embodiments of the invention have been described in detail, it should be appreciated that the invention may be implemented in many other forms without departing from the spirit or scope of the invention. For example, embodiments such as enumerated below are contemplated:

Item 1: An image rendering method for generating view-dependent images for a display including a plurality of pixels, includes:

providing, to a neural network, a plurality of 2D images of a 3D object, wherein the neural network includes a signed distance function including a sinusoidal representation network, wherein the signed distance function is represented by $S(x; \theta): \mathbb{R}^3 \to \mathbb{R}$, where $x \in \mathbb{R}^3$ is a location in 3D space and $\theta$ is a first learnable parameter of the sinusoidal representation network, and wherein the neural network further includes a spatially varying emission function E expressible as: $E(x,r_d,n,\theta,\phi): \mathbb{R}^9 \to \mathbb{R}^3$, where $\phi$ is a second learnable parameter of the sinusoidal representation network;

modeling, using a shape renderer, a shape of the 3D object by obtaining a zero-level set of the signed distance function including sphere tracing the signed distance function by:

defining a view: $V \in \mathbb{R}^{4 \times 4}$;
defining a projection matrix: $P \in \mathbb{R}^{4 \times 4}$;
solving for a ray origin: $r_0 = (V^{-1} \cdot [0,0,1,0]T)_{x,y,z}$;
solving for a ray direction: $r_d = v((P \cdot V)^{-1} \cdot [u_x, u_y, 0, 1]^T)$, where $(\cdot)_{x,y,z}$ are vector components and $v(\omega) = \omega_{x,y,z}/\|\omega_{x,y,z}\|$ is vector normalization;
minimizing $|S(x,\theta)|$ along each ray using iterative updates of a form: $x_0 = r_0$ and $x_{i+1} = x_i + S(x_i) r_d$; and
solving for a zero-set of rays converged to a foreground object for a step count n: $S_0 = \{x_n | S(x_n) = 0\}$;

modeling, using an appearance renderer, an appearance of the 3D object using E for directions $r_d \in \mathbb{R}^3$ in a global coordinate system, wherein modeling the appearance of the object includes:

conditioning E by a local normal direction $n = \nabla_x S(x)$ as computed by automatic differentiation;
minimizing an image reconstruction error for the 3D object in foreground pixels of the display, wherein the image reconstruction error is represented by:

$$\mathcal{L}_R = \frac{1}{|U|} \sum_{c \in I_{U_f}} |E(x, r_d, n; \theta, \phi) - c|,$$

where c is an RBG value of a foreground pixel of the display and U represents a portion of the pixels with RGB values $I_U$ and object masks $M_U$;

regularizing the signed distance function by an eikonal constraint represented by:

$$\mathcal{L}_E = \frac{1}{|U|} \sum_{x_r} \|(\|\nabla_x S(x_r; \theta)\|_2 - 1)\|_2^2,$$

where U represents a portion of the pixels with RGB values $I_U$ and object masks $M_U$;

restricting the coarse shape, using a soft mask loss defined for pixels other than the foreground pixels, by enforcing a projected pattern to fall within the boundaries of the object masks, wherein the soft mask loss is represented by:

$$\mathcal{L}_M = \frac{1}{\alpha |U|} \sum_{m \in M_{U/U_f}} BCE(sigmoid(-\alpha S_{min}), m),$$

where BCE is the binary cross entropy and $S_{min} = \arg\min_t S(r_0 + tr_d; \theta)$ is the minimum S value along the entire ray approximated by dense sampling of t; and regularizing the emissivity function to avoid overfitting to training views by linearizing the angular behavior using a smoothness term represented by:

$$\mathcal{L}_S = \frac{1}{|U|} \sum \|\nabla_{r_d}^2 E(x, r_d, n; \theta, \phi)\|_2^2;$$

optimizing the first learnable parameter $\theta$ and the second learnable parameter $\phi$ as:

$$\operatorname*{argmin}_{\theta,\phi} \mathcal{L}_R + w_E \mathcal{L}_E + w_M \mathcal{L}_M + w_S \mathcal{L}_S,$$

where $w_E$, $w_M$, and $w_S$ are weights for their respective loss functions combining outputs from the modeling of the shape, the modeling of the appearance, the linerizing, and the optimizing steps to generate a neural model representing the 3D object;

converting the neural model into a triangular mesh representing the 3D object; and rendering multiple view-dependent images representative of the 3D object using the triangular mesh.

Item 2: The method of Item 1, further including displaying the multiple view-dependent images to a user using a display.

Item 3: The method of Item 1, wherein rendering multiple view-dependent images is based upon a location of a viewer's eyes.

Item 4: The method of Item 3, wherein rendering multiple view-dependent images may be based upon a location of a viewer's head.

Item 5: The method of Item 1, further including displaying the multiple view-dependent images on a light field display.

Item 6: The method of Item 1, further including displaying the multiple view-dependent images on a head mounted display.

Item 7: The method of Item 1, wherein rendering multiple view-dependent images includes:
rasterizing the triangular mesh;
projecting vertex positions to each pixel;
computing angles $\tau_{1 \ldots N}$ between a ray towards a rendering camera and rays towards each of N projective texture map viewpoints.

Item 8: The method of Item 1, further including applying unstructured lumigraph rendering to blend contributions from first k textures $T_i$, sorted by $\tau_i$ in ascending order to create a rendered image represented by:

$$R = \Sigma_{i=1 \ldots k} w_i T_i,$$

where weights $w_i$ are computed as $\hat{w}_i = 1/\tau_i(1 - \tau_i tr_k)$ and $\hat{w}_i / \Sigma_{i=i \ldots k} \hat{w}_i$.

Emerging neural rendering approaches may outperform traditional vision and graphics approaches. Traditional graphics pipelines still offer significant practical benefits, such as real-time rendering rates, over these neural approaches. Embodiments disclosed previously take a significant step towards closing this gap, which may be a critical aspect for making neural rendering practical.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
modeling, using image data, a three-dimensional (3D) shape of an object by obtaining a zero-level set of a signed distance function using a shape renderer of a rendering engine;
modeling an appearance of the object by minimizing an image reconstruction error based upon the image data capturing the 3D shape of the object using an appearance renderer of the rendering engine;
combining the 3D shape and the appearance of the object to generate a neural model of the object;
converting the neural model into a triangular mesh representing the object using the rendering engine; and
rendering at least one image using the triangular mesh and using the rendering engine.

2. The method of claim 1, wherein the signed distance function is based at least in part on a location in 3D space and a first learnable parameter of a sinusoidal representation network.

3. The method of claim 1, wherein obtaining the zero-level set of the signed distance function includes sphere tracing the signed distance function.

4. The method of claim 3, wherein sphere tracing the signed distance function includes:
defining a view;
defining a projection matrix;
solving for a ray origin;
solving for a ray direction with vector components and a vector normalization;
minimizing along each ray using iterative updates; and
solving for a zero-set of rays converged to a foreground object for a set count.

5. The method of claim 1, wherein modeling the appearance of the object includes using a spatially varying emission function.

6. The method of claim 5, wherein modeling the appearance further comprises defining the spatially varying emission function for directions in a global coordinate system.

7. The method of claim 6, further comprising conditioning the spatially varying emission function by a local normal direction as computed by automatic differentiation.

8. The method of claim 7, wherein the spatially varying emission function includes a second learnable parameter of a sinusoidal representation network.

9. The method of claim 8, further comprising optimizing parameters based on weights for at least one loss function.

10. The method of claim 5, further comprising minimizing the image reconstruction error for the object in foreground pixels of a display.

11. The method of claim 10, wherein the image reconstruction error is based on a red-green-blue (RGB) value of a foreground pixel of the display and a portion of pixels with RGB values and object masks.

12. The method of claim 11, further comprising regularizing the signed distance function by an eikonal constraint.

13. The method of claim 12, wherein the eikonal constraint is based on a portion of pixels with the RGB values and the object masks.

14. The method of claim 13, further comprising enforcing a projected pattern to fall within at least one boundary of the object masks.

15. The method of claim 14, wherein enforcing the projected pattern comprises using a soft mask loss defined for pixels other than the foreground pixels of the display.

16. The method of claim 15, wherein the soft mask loss includes a binary cross entropy and a minimum value along an entire ray approximated by dense sampling.

17. The method of claim 16, further comprising regularizing the spatially varying emission function to avoid overfitting to training views.

18. The method of claim 17, wherein regulating the spatially varying emission function comprises linearizing an angular behavior using a smoothness term.

19. The method of claim 1, further comprising:
rasterizing the triangular mesh;
projecting vertex positions to each one of a plurality of pixels; and
computing angles between a ray towards a rendering camera and rays towards each of a plurality of projective texture map viewpoints.

20. The method of claim 1, further comprising applying unstructured lumigraph rendering to blend contributions from first textures, sorted in ascending order to create a rendered image based on computed weights.

21. The method of claim 1, wherein the at least one image is a view-dependent image.

22. A method, comprising:
modeling, using image data, a 3D shape of an object by obtaining a zero-level set of a signed distance function using a shape renderer of a rendering engine;
modeling an appearance of the object based on a spatially varying emission function using an appearance renderer of the rendering engine;
combining the 3D shape and the appearance of the object to generate a neural model of the object;
converting the neural model into a triangular mesh representing the object using the rendering engine; and
rendering at least one image using the triangular mesh and using the rendering engine.

23. The method of claim 22, wherein modeling the appearance of the object is performed after the modeling the 3D shape of the object within a processing pipeline.

24. The method of claim 22, wherein the image data is two-dimensional (2D) image data.

* * * * *